United States Patent [19]
Asprey

[11] Patent Number: 5,257,390
[45] Date of Patent: Oct. 26, 1993

[54] EXTENDED RANGE COMPUTER COMMUNICATIONS LINK

[75] Inventor: Robert R. Asprey, Harvest, Ala.

[73] Assignee: Cybex Corporation, Huntsville, Ala.

[21] Appl. No.: 736,508

[22] Filed: Jul. 26, 1991

[51] Int. Cl.$^5$ ............................. G06F 3/00; G06F 3/14
[52] U.S. Cl. ................... 395/800; 364/927.93; 364/935.2; 364/935.5; 364/239.9
[58] Field of Search ................ 395/200, 325, 800; 375/36

[56] References Cited

U.S. PATENT DOCUMENTS

| | | | |
|---|---|---|---|
| 4,665,501 | 5/1987 | Saldin et al. | 395/275 |
| 4,885,718 | 12/1989 | Asprey | 375/36 |
| 4,907,146 | 3/1990 | Caporali | 364/132 |
| 5,040,111 | 8/1991 | Al-Salameth et al. | 395/575 |
| 5,193,200 | 3/1993 | Asprey | 395/800 |

*Primary Examiner*—David Y. Eng
*Attorney, Agent, or Firm*—Phillips & Beumer

[57] ABSTRACT

This invention is an extended range communications link having a first signal conditioning network located near and coupled to a computer. The network conditions keyboard clock, keyboard data, logic ground, mouse clock, mouse data, R, G, and B analog video signals, and multiplexes HS and VS sync signals. Conditioning of the video signals includes reducing their amplitude so the video signals do not significantly cause induced crosstalk in conductors adjacent to the video conductors. An extended range cable up to about 800 feet in length and having a plurality of conductors is coupled to a signal conditioning circuit and conveys the conditioned, above-named signals, in addition to power and logic ground potentials, to a second signal conditioning network. The network restores the analog video signals to their original levels by discrete video amplifiers having constant current characteristics that do not cause power fluctuations to occur in the power conductors of the cable, also reducing induced noise. Additionally, the signal conditioning network demultiplexes the sync signals and further conditions the mouse and keyboard signals and the power and ground potentials prior to inputting the signals to the keyboard, mouse, and monitor.

18 Claims, 4 Drawing Sheets

EXTENDED RANGE COMPUTER COMMUNICATIONS LINK

FIELD OF THE INVENTION

This invention relates generally to extended range communications links for computers and particularly to such a system wherein a keyboard, monitor, mouse, and other computer peripherals and a VGA monitor may be operated up to about 800 feet from a computer.

BACKGROUND OF THE INVENTION

Computer extension systems that allow use of a keyboard, monitor, and other computer peripherals an extended distance from a computer are becoming increasingly popular, with a number of extension systems in use today. In these systems, and in a typical case, the computer is located in a more hospitable or convenient environment than the keyboard, monitor, mouse, printer, or other peripherals associated therewith, these components coupled to the computer by a single cable having a plurality of insulated conductors. Signal conditioning circuitry is coupled to one or both ends of the cable and conditions the digital and video signals attenuated by the extended length of the conductors conveying the discrete signals.

Problems with these systems generally involve induced noise, particularly video noise, and attenuation of the signals by the long cable lengths and RC rolloff filters typically used by manufacturers to reduce radiated noise as per FCC Part 15 requirements. Additionally, in single ended systems, offsets in ground potentials may, in some situations, be high enough to prevent some digital devices from transitioning to a low" logic level. In the signal conditioning network that receives the signals from the computer, particularly video and vertical and horizontal sync circuits, problems typically arise when video amplifier circuits are provided with ground and power potentials from the cable. In this instance, after traversing the length of the cable, the power potential is not at its original level due to line losses and in operation may fluctuate due to switching demands, causing nonlinear responses from video amplifiers supplied by this power. Also, both power and ground potentials suffer induced noise from adjacent conductors. Regulation of power sources in this case is not feasible because of the lack of stable reference potentials and also because of the extra power and voltage drain a regulator would impose. Also, since the analog video signals are of a wide bandwidth, from 10 kHz to 30 mHz, the combined impedance from line inductance, capacitance, and resistance attenuates some frequencies more than others, causing irregularities of the image on the monitor.

As color VGA computers and monitors enjoy increased usage, color backgrounds have become more prevalent. These color backgrounds in an extension system require higher quality digital signals than dark or black backgrounds. Signal anomalies such as ringing and reflections and attenuation of the high frequency components, or rise and fall times, of the video signals in the long conductors of the extension cable are much more apparent with a color background than a black background. Here, ringing and reflections typically cause "ghosts" of images on the monitor, while signal attenuation causes a leading edge, with respect to the horizontal sweep, of vertical lines of images to appear fuzzy and indistinct. Accordingly, a need has arisen for an extension system capable of transmitting video signals with data signals applied to discrete conductors of a cable, with ringing, reflections, attenuation, induced noise, and other extraneous signals being suppressed or otherwise compensated for.

The applicant has devised several extended range communications systems for coupling computer video and sync signals from a computer to a remotely located monitor. Notably, U.S Pat. No. 4,885,718, issued on Dec. 5, 1989, to Asprey et. al. discloses an extension system for extending computer video signals up to 150 feet to a monitor from the computer. Here, only monochrome signals are applied to the cable, with these signals driven at TTL levels. No attempt is made to bias the video levels to a selected bias, reduce amplitude of the signals to a significantly lower level, which causes less crosstalk than a stronger signal or to limit variance in current flow to the signal conditioning network at the monitor, which causes non-linear responses of the video amplifiers therein.

In patent application Ser. No. 07/447,010, filed on Dec. 5, 1989, by Asprey et. al. now U.S. Pat. No. 5,193,200, color video signals are transmitted by TTL buffers on an extended cable up to 300 feet to a monitor. Here, the signals are attenuated by a roll-off filter prior to being applied to the cable and conditioned by Schmitt-triggered amplifiers in the receiving signal conditioning network. No attempt is made to bias the signal to a higher potential, significantly reduce the amplitude of the signal, or limit variance of current flow to the signal conditioning network at the monitor.

In patent application Ser. No. 07/488,710, filed on Mar. 5, 1990, by Asprey et. al., an extension system is disclosed wherein analog video signals and horizontal and vertical sync signals are used to modulate current flow through an extended conductor of a cable. In this system, the video signals are terminated at close to the characteristic impedance of the conductor. Additionally, the video signals are impedance matched to the conductor of the cable and applied thereto at close to their original levels. No attempt is made to bias the video signals to a selected level, significantly reduce their amplitude, or limit variance of the current flow to the signal conditioning network at the monitor.

Lastly, patent application Ser. No. 07/555,580, filed on Jul. 19, 1990, by Asprey et. al. discloses extended communications links up to 1,000 feet. Here, the video signals are digital signals and are biased to a selected level and reduced in amplitude. However, the digital video signals are provided with a voltage spike on leading edges thereof as precompensation that would degrade performance of the instant invention and negate the effect of reducing crosstalk provided by significantly reducing the amplitude of the video signal. Additionally, since this system is digital in nature, it cannot be used with the analog video signals of the instant invention since analog video signals are not compatible with the digital switching thresholds of the referenced application, which would result in analog video on the wrong side of these thresholds being lost.

Accordingly, it is an object of this invention to provide an extension system for transmitting analog video signals applied to conductors of a cable in conjunction with other signals applied to other conductors of the cable to a monitor located up to 800 feet distant from the source of the video signals.

Additionally, it is a further object of the invention to provide an extension system for extending the distance between a computer and a variety of peripheral components, including a keyboard, mouse, modem or printer, monitor, speech synthesizer, or speaker, up to about 800 feet from the computer.

SUMMARY OF THE INVENTION

A system is disclosed for transmitting signals applied to insulated conductors of a cable, with at least one of the conductors of the cable having an analog video signal impressed thereon, and including a first video signal conditioning circuitry coupled to a source of the video signal and a second video signal conditioning circuitry providing the video signal to the monitor. In the first signal conditioning circuitry, current signal passing means responsive to the video signal provides a current signal to an anti-ringing circuit having resistive and reactive components for damping ringing of the video signal and passes the current signal to an anti-reflection circuit for damping reflections of the current signal. Next, the current signal is applied to a first voltage divider, which biases the signal to a selected voltage level with attenuation and, with the anti-ringing and anti-reflection circuits, terminates the signal at close to the characteristic impedance of the conductor. The signal is then applied to the conductor of the cable. In the second signal conditioning circuitry, the video signal is again applied across a second voltage divider, which assists in termination of the signal, after which the signal is passed to an amplifier that amplifies the video signal such that amplitude of the signal varies directly with frequency, with the second signal conditioning network providing the amplified video signal as an output.

DETAILED DESCRIPTION OF THE PREFERRED EMBODIMENT

Figures 1, 1A:
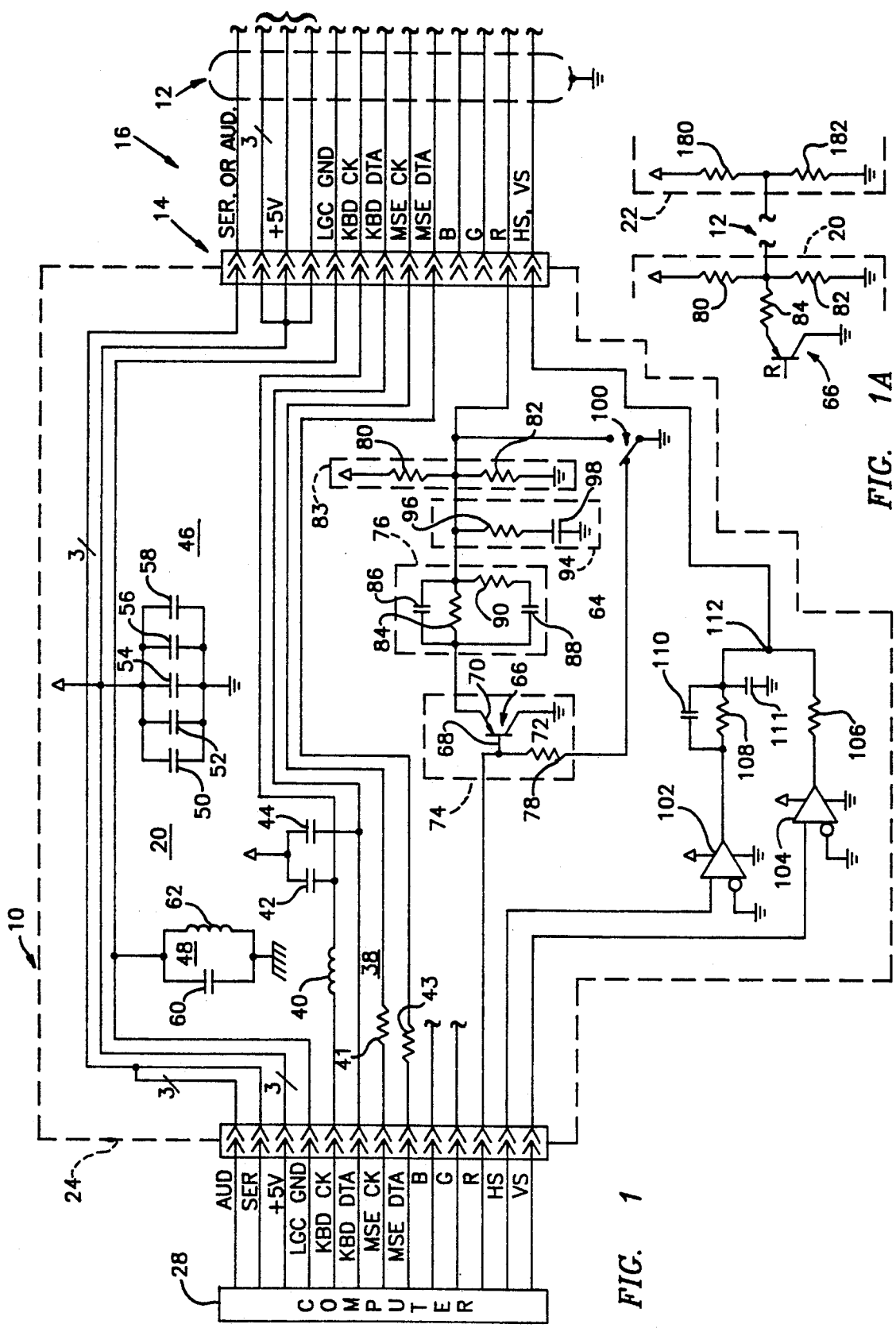
FIG. 1 is a schematic diagram of a signal conditioning network coupled to and located at a source of digital and analog signals, such as a computer, and connected to conductors of an extended cable.
FIG. 1a is a schematic diagram of particulars of construction of the present invention.
Figure 2:
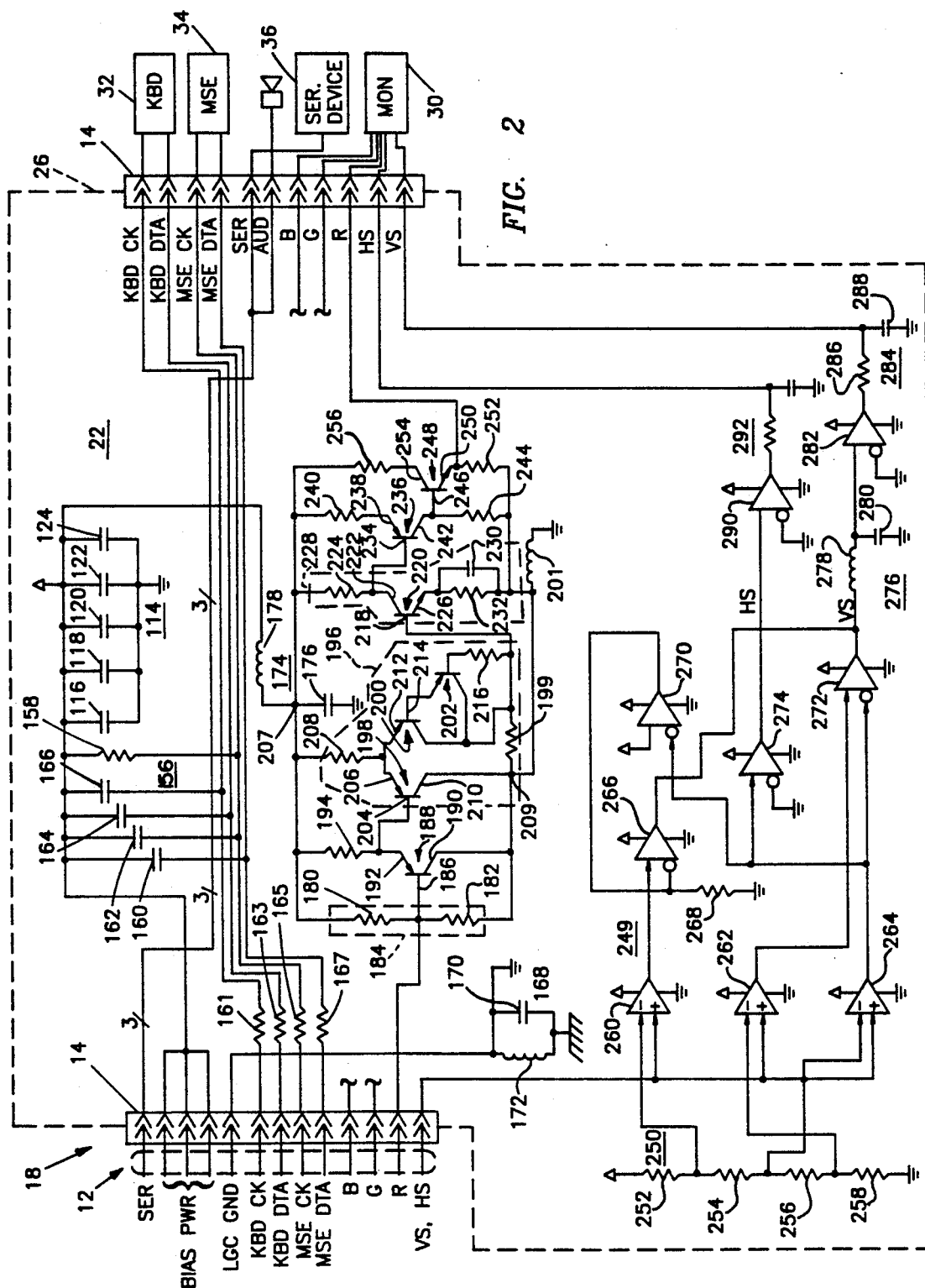
FIG. 2 is a schematic diagram of a signal conditioning network at an opposite end of the cable for receiving the signals and conditioning them prior to passing them to discrete devices.

Referring initially to FIG. 1, a system 10 is shown for transmitting analog red, green, and blue, or monochrome, video signals and horizontal and vertical sync signals, keyboard and mouse clock and data signals, signals for synthesized speech or signals to and from a serial computer port, and bias power and logic ground potentials on a conventional cable 12 up to approximately 800 feet in length and having a plurality of adjacent, insulated conductors designated HS, VS, R, G, B, MSE DTA, MSE CK, KBD CK, KBD DTA, LGC GND, +5V, and SER. While these signals typically originate in and are transmitted from a computer, any combination or subcombination of the above-named signals may be transmitted using the instant invention from any source of these signals to devices utilizing these signals. The conductors of cable 12 are conventionally coupled using commercially available connectors 14, at opposite ends 16 (FIG. 1) and 18 (FIG. 2) to signal conditioning networks 20 (FIG. 1) and 22 (FIG. 2). Networks 20 and 22 are typically housed in enclosures 24 and 26 (dashed lines), but network 20 may be located in computer 28, and network 22 may be located in any of the components coupled to end 18 of cable 12. Network 20 is also coupled to Video and sync terminals, serial port or audio output terminals, and keyboard and mouse terminals, and bias power, typically 5 volts, and logic ground terminals of computer 28, and passes modified video and sync signals and stabilized power and ground potentials to cable 12. Network 22, at the opposite end of cable 12, is powered by the stabilized bias potential and logic ground, although the impedance of the conductor of cable 12 causes a voltage drop that reduces the bias potential to a potential generally between 4 and 5 volts, with the ground conductor having an offset as high as 0.5 volt. Additionally, the analog video signals R, G, and B in the case of a color analog monitor, and in the case of a monochrome monitor, a monochrome signal on the G signal line, and sync signals are provided by network 22 to respective terminals of a monitor 30. Alternately, stable, conventional power and ground sources may be utilized to power network 22. Additionally, network 22 receives the clock (CK) and data (DTA) signals from a keyboard 32 and mouse 34 and applies these signals to respective conductors of cable 12 and applies the serial or audio signals, if used, from the computer to a serial peripheral device 36, such as a printer or modem for the serial device, or speaker for the audio signals. Leads from the connectors of the audio jack and serial port are connected in parallel in both signal conditioning circuits 20 and 22 so that either audio or serial signals may be sent over the respective conductors of cable 12.

In general, network 20 conditions the video signals prior to the signals being applied to discrete conductors of cable 12 and multiplexes the sync signals HS and VS such that they may be applied to a single conductor HS, VS of cable 12. The keyboard and mouse signals (CK, DTA) are filtered prior to being applied to conductors KBD CK, KBD DTA, MSE CK, and MSE DTA of cable 12, and the power and ground potentials applied to cable 12 are stabilized. In the instance where a monochrome monitor is used, only circuitry for the green video signal (G) is used, with the output from the red and blue video signals (R, B) being grounded and a high impedance presented to the red and blue outputs of the video driver card of the computer. This elicits a monochrome signal from the video driver card of the computer, which is conditioned by the green video conditioning circuitry of networks 20 and 22 and passed to a monochrome monitor from network 22.

In network 22, the analog video signals, attenuated by the conductors of cable 12 and conditioned by network 20, are restored to analog levels and applied to monitor 30. The sync signals are demultiplexed and also applied to monitor 30. The keyboard and mouse signals are filtered and applied to keyboard 32 and mouse 34, and the serial or audio signals are passed unchanged to the appropriate device. The power and logic ground potentials received from network 20 are also stabilized in network 22.

Examining signal conditioning network 20 in more detail, and referring to FIG. 1, the keyboard and mouse clock and data lines are each provided with noise reduction circuits 38 for reducing noise on the clock and data signals applied to the discrete conductors conveying mouse and keyboard signals. For the keyboard clock line KBD CK, an inductor, or choke 40 of about 39 microhenries, coupled in series with the clock line, blocks induced high frequency video noise from the keyboard clock input terminal of computer 28. For both the keyboard clock and data lines, capacitors 42 and 44 of about 470 picofarads each coupled between the lines and a stable source of potential, such as bias power or logic ground, shunt higher frequencies, down to about 10 kHz, to the potential. Resistors 41 and 43 of a relatively low value, such as 100 ohms, in series with the mouse clock and data lines reduce ringing that may be present with some cable lengths from being passed to computer 28. Additionally, since power, or +5 volts, is applied to a plurality of conductors of cable 12 in order to power network 22, as will be described, conditioning of power and of the logic ground is undertaken.

Power and logic ground conditioning is accomplished by power conditioning network 46 and logic ground conditioning network 48. For power conditioning network 46, capacitors 50, 52, and 54, of about 0.1 microfarad, are utilized to localize power surges. These capacitors are coupled between the power source from computer 28 and a ground potential and provide a high pass filter between power and ground, allowing high frequency noise to be passed to ground potential, while capacitors 56 and 58, of 22 microfarads and 0.33 microfarad, provide stabilization against low frequency transient fluctuations. For the logic ground conductor LGC GND, LC network 48 comprising electrolytic capacitor 60 of about 470 microfarads coupled between the logic ground conductor and chassis ground shunts low frequencies, such as 60 Hz, to chassis ground, while inductor 62, of about 39 microhenries and coupled in parallel with electrolytic capacitor 60, passes higher frequencies up to about 5 kHz to chassis ground. This stabilizes the ground potential of logic ground and removes induced noise from the logic ground conductor of cable 12. No conditioning is undertaken for the serial or audio lines.

Figure 4:
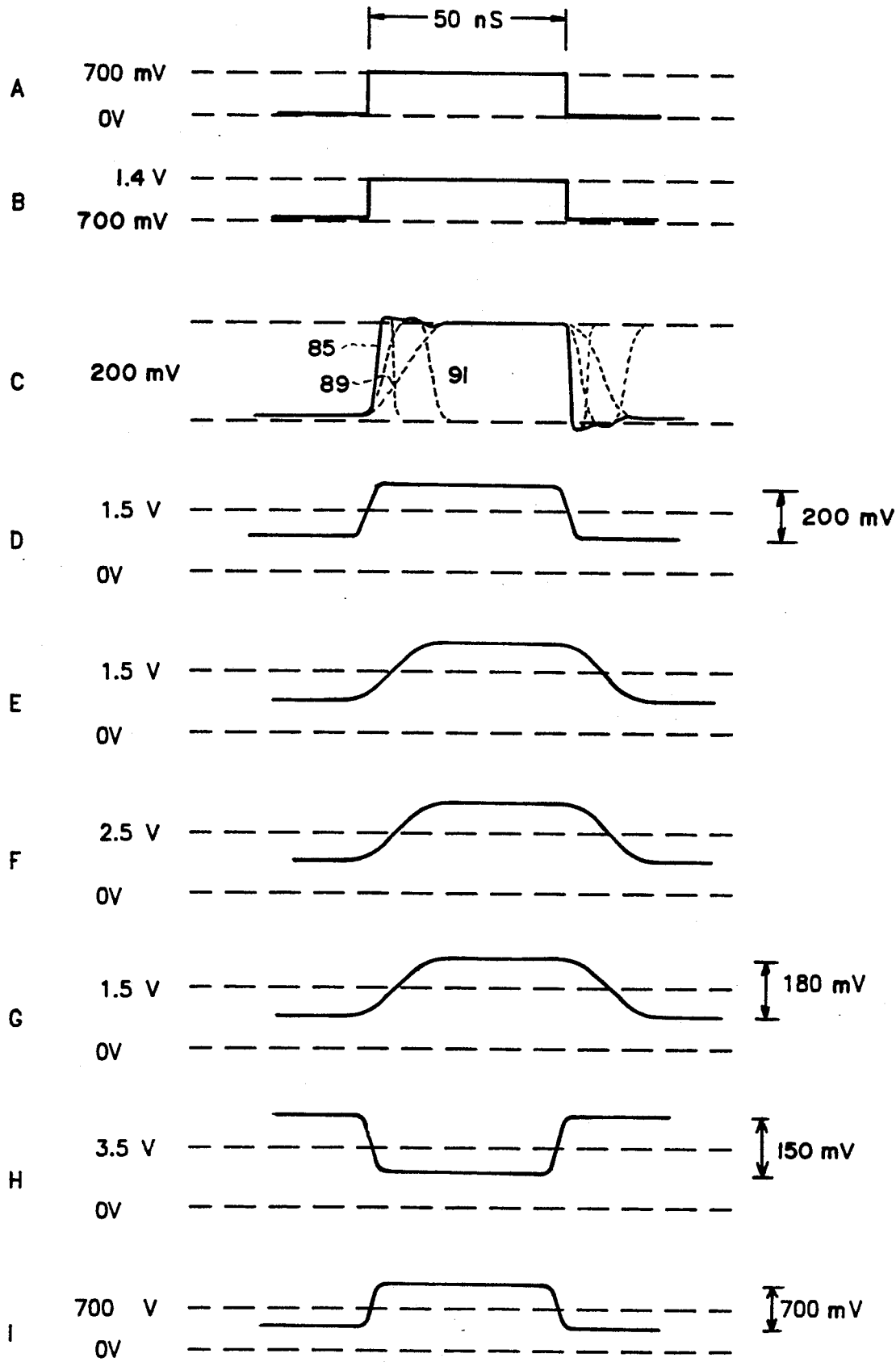
FIG. 4, consisting of A-I, is a view of a video signal waveform at various points in the signal conditioning networks.

Network 20 includes discrete video signal conditioning circuits for conditioning red, green, and blue analog video signals from computer 28, with only the red circuit being shown. These video signals from computer 28 generally range from 0–700 millivolts amplitude beginning at 0 volts and rising to about 700 millivolts and have a minimum width of about 50 nanoseconds, corresponding to a single picture element (pixel) of the monitor, as shown for a video pulse 29 of waveform A in FIG. 4. Thus, the circuitry for conditioning the red, green, and blue signals must be capable of linearly amplifying and passing signals of a bandwidth from 10 kHz to 30 mHz. Initially, in each of the video signal conditioning circuits, a PNP transistor 66 (FIG. 1) coupled in emitter-follower configuration having a base 68 coupled to the red video signal from computer 28 and a collector 72 coupled to ground provides on emitter 70 a current amplified red video signal (waveform B of FIG. 4) coupled to a filter and tuning network 76. In network 76, a resistor 84 of about 100 ohms passes D.C. components of the signal, critically damping transitions, as shown by critically damped curve 91 (waveform C), to transistor 66 and passes all frequency components of the video signal. A high pass capacitor 86 of about 100 picofarads in parallel with resistor 84 presents a smaller impedance to high frequency components of the signal and provides a short burst of energy 85 (waveform C) to leading edges of signal transitions. A capacitor 88 of about 470 picofarads in series with a resistor 90 of about 680 ohms, with resistor 90 and capacitor 88 coupled in parallel across resistor 84, form a medium pass filter that passes mid-range components of the video signal. Also, capacitor 88 provides an additional, longer burst of energy 89 to signal transitions shortly following the short burst of energy 85 provided by capacitor 86, this energy being in the critically damped rising and falling regions of the signal. These bursts of energy combine with the critically damped curve 91, as shown in the darkened waveform C to effectively shorten the rise/fall times while maintaining critical damping, providing a crisp leading edge to black to white transitions of images on the monitor with no ringing. While the specific values of components that are enumerated herein for network 76, in this example for a cable of about 800 feet in length, other values of components may be used, and additional resistors and capacitors may be coupled in parallel with resistor 84 and capacitor 86, for tuning network 76 to particular cable lengths. After passing through network 76, the signal is then passed to an anti-reflective and attenuating circuit 94 that dampens reflected signals on the R conductor and dampens high frequency components of the video signal in excess of the 30 mHz video signal, these high frequency components being present due to digital switching employed in computer 28 to create the analog signal.

Bias power for transistor 66 is provided via resistor 80 of about 180 ohms coupled between conductor R and bias power, with a second resistor 82 of about 324 ohms coupled between conductor R and ground, forming a voltage divider network 83 having a ratio of about 1:1.8. With such a ratio, and with no video signal applied to transistor 66, an unloaded potential of about 3.4 volts is impressed on the R signal line coupled to the R conductor of cable 12, with this potential applied via resistor 84 to emitter 70 of transistor 66. However, the potential on cable 12 is modified by a second voltage divider network 184 in network 22 and illustrated in the simplified transmission scheme of FIG. 1a. Here, a resistor 180 of about 390 ohms coupled in series with a resistor 182 of about 100 ohms, with resistor 180 coupled to power and resistor 182 coupled to ground, and a mid-point between these resistors coupled to the R conductor of cable 12, has a ratio of about 4:1 and provides about 1 volt potential to the R conductor. Since potential from resistor 80 is presented with a relatively higher impedance to ground through resistor 82 and the combined impedance of resistor 84 and transistor 66, a current flow of about 6 milliamps through the R conductor from resistor 80 to ground via the relatively lower impedance of resistor 182 is established, maintaining about 1.5 volts quiescent potential applied to the conductor by network 83, or a potential slightly less than fifty percent of the power supply potential of about 5 volts. This biasing off-sets line losses and biases the signal above a potentially noisy ground potential and provides a voltage region off-set by at least one diode drop (700 millivolts) from 0 and +5 volts within which the signal fluctuates. Thus, when the 0–700 millivolt analog video signal is applied to the base of transistor 66, its resistance is varied in accordance with the signal, causing a signal current flow of about 8.9 milliamps maximum and representative of the video signal to flow from resistor 80 through transistor 66 via resistor 84 to logic ground. This in turn varies the 6 milliamp current flow between resistor 80 and resistor 182 with a current swing of about 1.5 milliamps, as opposed to current fluctuations of about 10 milliamps for a conventional connection between a computer and monitor, such that the described 1.5 volt potential across resistor 182 fluctuates in accordance with the video signal with an amplitude of about 200 millivolts centered about the 1.5 volt potential, as shown in waveform D of FIG. 4. This reduced-in-amplitude signal with the low, 1.5 milliamps current fluctuations creates less crosstalk in adjacent conductors than a stronger signal and allows keyboard and mouse clock and data signals to be applied to conductors in the same cable with the video signals without the use of discretely shielded conductors nor twisted pair conductors in cable 12, allowing use of a relatively inexpensive cable. Also, it is believed that the continuous current flow of about 6 milliamps on the R, G, and B conductors of cable 12 dampens induced noise from adjacent conductors. Additionally, these voltage divider networks 83 and 184, along with the reactance of circuits 76 and 94, terminate the video conductors at about 53.5 ohms at D.C., close to the characteristic high frequency impedance of the transmission conductors in cable 12, which is about 54 ohms, and dampen ringing and reflected signals that may be present. While the disclosed values of resistors 80, 82, 84, 180, and 182 are selected to provide attenuation of the video signal to about a 200 millivolt level, it is believed these values may be varied to provide attenuation of the video signal up to about sixty percent of the original 700 millivolt signal, or about 420 millivolts, without seriously degrading operation of the instant invention.

A switch or jumper 100 selectively applies a ground potential to load resistor 78 of about 82 ohms or to conductor R, which ground, when applied to resistor 78, signals to the video driver card that a color monitor is coupled to the computer; and when switch 100 applies a ground potential to conductor R, a high impedance is applied to the video driver card, signifying that a monochrome monitor is coupled to computer 28. This switch is absent in the green signal conditioning circuit because the green circuit provides and conditions the monochrome signal. An 82-ohm load resistor is used in order to reduce the load on the video driver card of the computer and to provide a slightly higher amplitude video signal, at or above 700 millivolts, to transistor 66 in order to assist in offsetting voltage losses.

The sync signals, horizontal sync (HS) and vertical sync (VS) from computer 28, are amplitude multiplexed by horizontal sync gating buffer 102 and vertical sync gating buffer 104. Buffers 102 and 104 each have an active "low" enable tied to a ground potential, meaning that the HS and VS pulses of about 3.5 volts are freely provided by buffers 102 and 104. For multiplexing these signals, a resistor 106 of about 1K ohms in series with output of amplifier 104 reduces amplitude of the VS pulses to about 1.2 volts, and a resistor 108 of about 510 ohms in series with the output of amplifier 102 reduces amplitude of the HS pulses to about 2.35 volts, or about twice the amplitude of the VS pulses. Resistors 106 and 108 are selected to provide an amplitude ratio between the horizontal and vertical sync signals of about 2:1 so that, when the HS and VS pulses are superimposed on one another, the VS portion of the combined signal is about half the amplitude of the HS portion of the signal.

Figure 3:
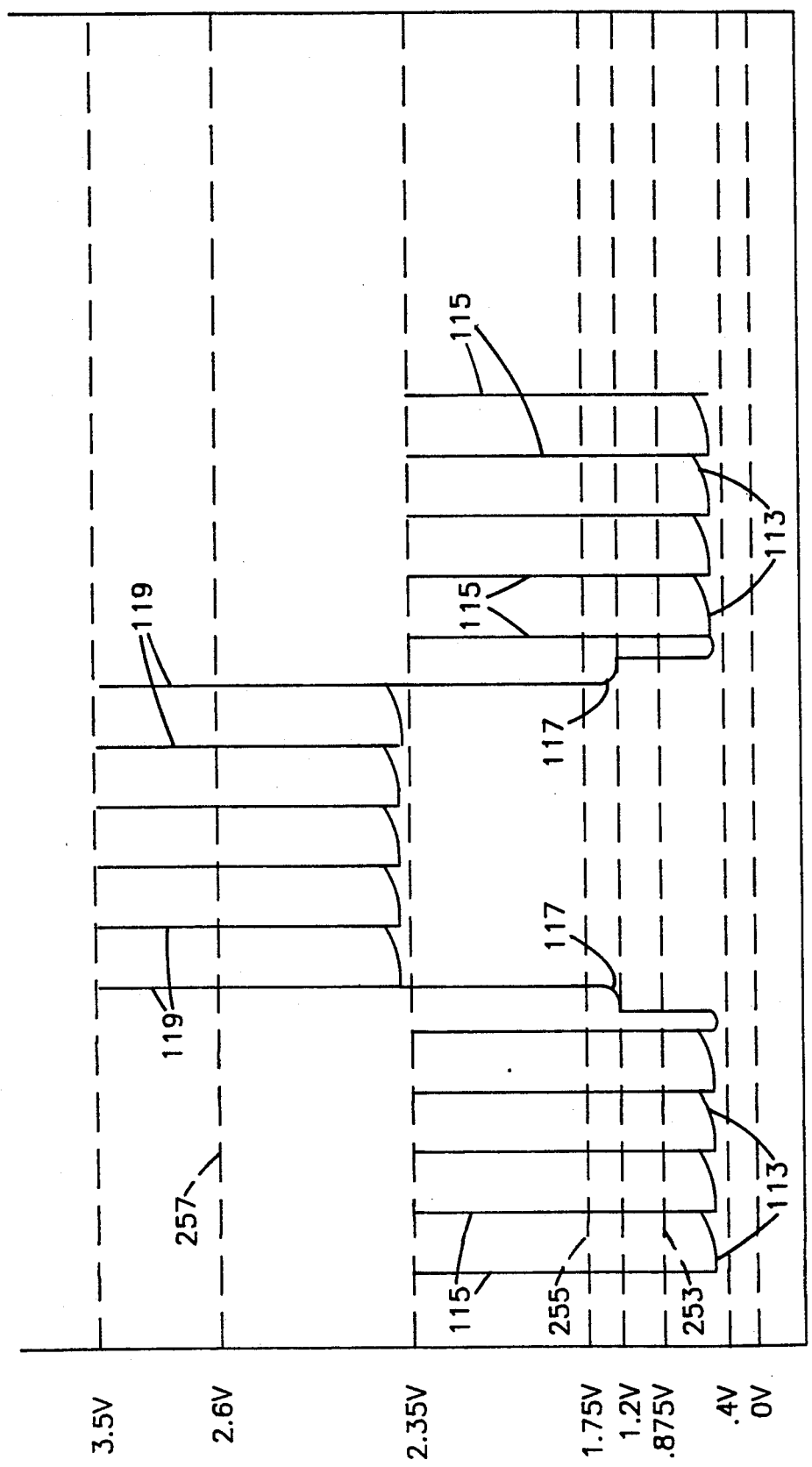
FIG. 3 is a view of a multiplexed sync signal waveform of the present invention.

A filter capacitor 110 of about 470 picofarads in parallel with resistor 108 passes high frequency components of the HS signal, and a capacitor 111 of about 2,200 picofarads between the reduced HS signal and ground comprises a roll-off filter to limit noise radiation. The output of this filter network, a 2.35 volt HS sync signal, is wire OR'd at point 112 with the 1.2 volt signal from buffer 104 and resistor 106 to provide an amplitude modulated signal containing a higher amplitude of HS signals and a lower amplitude of VS signals, with this combined signal applied to a single conductor HS, VS of cable 12. Thus, and referring to FIG. 3, with no sync signal, a "low" logic level 113 is seen on the sync conductor HS, VS; with an HS pulse only, a voltage pulse 115 of about 2.35 volts is seen on conductor HS, VS; with a VS pulse 117 only, a voltage pulse of about 1.2 volts is seen on conductor HS, VS; and with both the HS and VS pulses present, a voltage pulse 119 of about 3.5 volts is seen on conductor HS, VS. Since the VS pulse 117 is of a much lower frequency than the HS pulse 115, several of the HS pulses may occur during the VS pulse, causing the combined HS and VS pulses to rise to the full 3.5 volt level, with the HS pulses occurring during the VS pulse falling only to about 2.35 volts.

At the opposite end of cable 12, in signal conditioning network 22, the bias power potential, which is reduced to a potential of between 4 and 5 volts due to line losses and applied to at least three conductors of cable 12 in order to distribute current flow to network 22, is again conditioned to filter any induced noise from the power potential powering network 22. For stabilizing the power potential, a filter network 114 comprising capacitors 116, 118, 120, and 122 of about 0.1 microfarads and a capacitor 124 of about 22 microfarads are coupled between power from cable 12 and logic ground. As with network 46 in signal conditioning network 20, the larger capacitor stabilizes the power potential by eliminating transient fluctuations, with the smaller capacitors passing high frequency noise to the ground potential. Also, the keyboard and mouse clock and data lines are filtered by a noise filtering network 156, which includes a pull-up resistor 158 of about 5.1K on the mouse clock line to decrease the rise time of the mouse clock signal. Capacitors 160, 162, 164, and 166, of about 470 picofarads each, provide a high pass filter to shunt high frequency noise induced in the clock and data signals to the stabilized power potential. Also, series resistors 161, 163, 165, and 167, each of about 100 ohms, prevent ringing of the clock and data signals.

Still further, an LC network 168 comprising a capacitor 170 of about 470 microfarads and an inductor 172 of about 39 microhenries is coupled between logic ground and chassis ground. This network passes any D.C. offset and low frequencies from logic ground to chassis ground, stabilizing the logic ground potential. Further yet, for the discrete video amplifiers as shown for the red video amplifier, the power potential is further conditioned by an LC network 174 comprising a capacitor 176 of about 0.33 microfarad and an inductor 178 of about 39 microhenries prior to being applied to the video amplifiers. These networks block high frequencies induced in the power conductors which may be passed by the described filtering to the video amplifiers. Additionally, for high frequency choking of the logic ground potentials for the video amplifiers, a series inductor 201 of about 39 microhenries blocks this high frequency noise from the ground potential applied to the video amplifiers.

As with network 20, the audio and serial leads in network 22 to the audio and serial connectors of the respective devices are coupled in parallel with the three conductors in cable 12, with these conductors conveying either serial signals or audio signals.

Each of the discrete identical red, green, and blue video signal conditioning networks (only the red circuit shown for convenience) linearly restore the video signals received from cable 12 to analog video levels and provide them to monitor 30. Initially, the high frequency components of the video signals received by network 22 are attenuated by the conductors of cable 12, as shown in waveform E of FIG. 4, further reducing crosstalk between the video conductors and adjacent conductors. This attenuated signal is applied to a voltage divider network 184 having resistor 180 of about 390 ohms coupled between video power supplied as described and conductor R and a resistor 182 of about 100 ohms coupled between conductor R and the conditioned ground potential. Network 184 functions as described above by providing a quiescent voltage of about 1.5 volt in conjunction with the transmitting end termination network and drawing about 6 milliamps current flow such that the signal appears as shown in waveform E of FIG. 4 and assists in terminating the video conductors at close to their characteristic impedances as described.

The signal from voltage divider network 184 is applied to base 186 of a transistor 188 having a collector 190 coupled to logic ground and an emitter 192 coupled via resistor 194 of about 82 ohms to video power terminal 207 conditioned as described by networks 114 and 174. Biased as such in emitter follower configuration, with a potential of between 4 and 5 volts from resistor 194 on emitter 192, the video signal of about 200 millivolts and centered about a +1.6 volt potential applied to base 186 elicits a current amplified flow having a potential from about 2.2 to 2.4 volts, as shown in waveform F and having a current variation of about 2.4 milliamps through transistor 188 These fluctuating potentials of the R video signal signal are applied to a non-inverting, emitter-coupled, near constant current amplifier circuit 196 consisting of PNP transistors 198, 200, and 202, with transistors 200 and 202 coupled in a Darlington configuration, and transistor 198 coupled in common emitter configuration to transistor 200. The bias potential from resistor 208 of about 68 ohms and coupled to video power provides from about 2.9 to 3.1 volts to the common emitters 206 and 212, with collector 210 of transistor 198 coupled to ground via RF choke 201. The collector of transistor 200 is coupled to the collector of transistor 202, to ground via resistor 199 and choke 201, and to the base of transistor 202 through resistor 216 of about 100 ohms.

Coupled as described in the foregoing, the signal from emitter 192 of transistor 188 applied to base 204 of transistor 198 causes a fluctuating current flow having a current swing of about 2.9 milliamps and responsive to the video signal to flow through transistor 198, with potentials of this flow, or the video signal, appearing across resistor 199. Thus, as the video signal rises, current flow through transistor 198 decreases, in turn decreasing the potential across resistor 199 and decreasing the potential applied to the base of transistor 202 via resistor 216. This decreases resistance of transistor 202, in turn lowering the potential applied to base 214 of transistor 200, lowering resistance of transistor 200 and causing an increase in current flow through transistor 200 which is inversely proportional to the decrease in current flow through transistor 198. Conversely, a decrease in signal potential applied to base 204 causes an increase in current flow through transistor 198, which increases the potential across resistor 199 and increases the potential applied to the base of transistor 202 through resistor 216. This biases transistor 202 to a higher resistance, allowing the potential on base 214 of transistor 200 to increase, biasing transistor 200 to a higher resistance and decreasing current flow through transistor 200 inversely proportional to the increase in current flow through transistor 198. The 200 millivolt fluctuations across the pull-up resistors 194 and 208 cause power supply current variations opposite to final output demand currents. Thus, when the input voltage rises 200 millivolts, the current from the supply through resistors 194 and 208 is reduced by about 2.4 and about 2.9 milliamps, respectively. With the aforementioned 200 millivolt input voltage rise, output current demand is increased by about 9.3 milliamps, as will be explained, resulting in a net current increase of 9.3 milliamps minus the decrease in current through resistors 194 and 208 of 5.3 milliamps, or only 4 milliamps net increase. Additionally, circuit 196 provides about a ten percent voltage reduction, to about 1.3 volts, reducing amplitude of the video signal to about 180 millivolts, and a bias shift of about 200 millivolts to center at about 1.3 volts, as shown in waveform G of FIG. 4. Additionally, due to inversion and reinversion of the video signal in the output stages of the video circuit, as will be described, current flow to the red, green, and blue video conditioning circuits is further limited in variance. Accordingly, the current flow to each of the red (R), green (G), and blue (B) video amplifiers is a nearly constant, continuous 50 milliamps which, as stated, swings only about 4 milliamps for a maximum 9.3 milliamp output. Thus, current perturbations in the power conductors that can cause radiated crosstalk to adjacent conductors in cable 12 and non-linear responses from the video amplifiers is kept to a minimum.

Next, the red video signal, having about a 180 millivolt swing centered about a bias of approximately 1.3 volts, is taken from the collector of transistor 200 and applied to base 218 of transistor 220, which transistor having a collector 222 coupled via a 68 ohm resistor 224 to bias power, and its emitter 226 coupled to a frequency dependent degenerative feedback network 228. Network 228 provides decreasing impedance with increasing frequency by virtue of the values selected for capacitor 230, which is about 220 picofarads, and resistor 232, which is about 82 ohms. This network, in conjunction with resistor 224, allows transistor 220 to provide increasing gain with increasing frequency and some voltage attenuation for low frequency signals. For instance, a 1 mHz signal applied to base 218 of transistor 220 provides unity gain, while a 10 mHz signal applied to base 218 causes transistor 220 to provide a gain of about 1.5. Thus, the higher frequencies of the red video signal, which extend upward to about 30 mHz, are amplified and inverted, as shown in waveform H of FIG. 4, providing frequency compensation to these higher frequencies that are lost in the earlier and following stages of the video signal conditioning networks, and in the conductors of cable 12. The signal is then taken from the collector of transistor 220 and has a slightly reduced swing of about 150 millivolts centered about a potential of about 3.5 volts. In inverting the signal, circuit 228 draws a current flow which fluctuates about 2.4 milliamps from terminal 207, generally offsetting or countering the oppositely phased current flow through the following resistor 240.

The frequency-enhanced output of network 228, a signal of about 180 millivolts with a current variation of about 2.2 milliamps and biased to a potential of about 3.5 volts, is taken from the collector of transistor 220 and applied to base 234 of transistor 236. Emitter 238 of transistor 236 is coupled to video power via a resistor 240 of about 82 ohms, and collector 242 is coupled to ground via a resistor 244 of about 510 ohms. Biased and coupled as such, transistor 236 reinverts the red signal, as shown in waveform I of FIG. 4, which was inverted by transistor 220, and provides a voltage gain of about 6 with a maximum current flow of about 1.8 milliamps, boosting the signal to have an amplitude swing of about 700 millivolts. Also, due to the values selected for resistors 240 and 244, the center point of the signal is reduced from 3.5 volts to about a 1.15 volts potential. This amplified signal is applied to base 246 of transistor 248 which has an emitter 250 coupled to ground via a resistor 252 of about 1K ohms and a collector 254 coupled to bias power via a current limiting resistor 256 of about 82 ohms. Coupled in emitter-follower configuration, transistor 248 reduces the bias level of the signal to a video level so that the signal swings from 0 to 700 millivolts, with a current swing of from about 0 to 9.3 milliamps and provides power to drive the signal across the 75 ohm load in monitor 30. It is noted that the cumulative current swing through network 196 and transistor 188, being 2.9 milliamps and 2.4 milliamps, respectively, are alike in phase and therefore additive to produce a swing of about 5.3 milliamps, partially cancelling the oppositely phased current flow through output transistor 248. Also, current flow through transistor 220 and 236 is approximately equal in magnitude and of an opposite phase such that these current flows cancel each other. This produces a net current swing of current flow through network 22 of about 4.0 milliamps, for a maximum 9.3 milliamp output, with this 4.0 milliamp current swing centered about a current flow of about 50 milliamps for network 22. Additionally, it is seen that the values of resistors 194 and 208 may each be changed to about 40 ohms, which would result in increased current flow through transistor 188 and network 196, completely off-setting current flow through buffer transistor 248. However, this would increase current flow through the conductors of cable 12 and possibly increase the voltage drop thereacross to a lowered potential such as to cause unpredictable operation of the keyboard and mouse. It has been found that the disclosed values for resistors 194 and 208, 82 and 68 ohms, respectively, provides an acceptable compromise between current fluctuations in the power conductors and too much current flow therein, which would produce the unacceptable voltage drop. In the instance where it is contemplated to provide external power to network 22, reducing resistance of resistors 194 and 208 in order to completely balance current flow to the video amplifiers is a feasible approach.

Next, the demultiplexing of the amplitude multiplexed sync signals by demultiplexing circuit 249 will be examined. As will be recalled, the HS and VS pulses are amplitude multiplexed at a 2:1 ratio. For separating the HS and VS signals, the multiplexed signal is first applied to the non-inverting input of comparators 260, 262, and 264. A voltage divider network 250 consisting of resistors 252, 254, 256, and 258, with resistor 252 coupled to bias power and resistor 258 coupled to a ground potential, provides three voltage levels which are applied to comparators 260, 262, and comparator 264 as reference potentials. For comparator 260, the reference potential supplied by resistors 252 and 254 to the inverting input is about 2.6 volts; for comparator 264, resistors 254 and 256 provide about 1.75 volts to the inverting input; and for comparator 262, resistors 256 and 258 provide about 0.875 volt to the inverting input. Thus, thresholds 253, 255, and 257 (FIG. 3) are established at 0.875 volt, 1.75 volts, and 2.6 volts, respectively, above which the respective comparator will be triggered to provide an enabling output at a digital logic level, typically 3.5 volts.

The output of comparator 260 is coupled to one input of a buffer amplifier 266, with the other input of buffer 266, an active low enable, coupled to ground via a 1K resistor 268 and to the output of a like buffer amplifier 270. Amplifier 270 is coupled as an inverter having an input tied to bias power and the active low enable thereof coupled to the output of comparator 264, the active low enable of buffer 272, and the input of buffer 274. Buffer 274, having its active low enable coupled to ground, serves as a buffer amplifier which freely passes the signal from comparator 264 as the HS signal. Thus, when a pulse 119 (FIG. 3) on sync line HS, VS goes above 2.6 volts (threshold 257), signifying a combined VS and HS pulse, comparators 260, 262, and 264 provide a "high" logic level to the active low enable of amplifiers 270 and 272, disabling them, and applying a "high" to the input of amplifier 274. Amplifier 274, having its active low enable tied to ground, in turn passes this high as a HS pulse during the duration of the VS pulse. The VS pulse is obtained as HS pulse 119 falls below 1.5 volts (threshold 255) but above 0.875 volt (threshold 253), switching off comparators 260 and 264, allowing the high from comparator 262 to be passed by amplifier 272 as a vertical sync pulse. Thus, the VS pulse is obtained from amplifier 266 when the multiplexed signal is above 2.6 volts and from amplifier 272 when the multiplexed signal is above 0.875 volts and below 1.5 volts.

In the instance of an HS pulse occurring in the absence of a VS pulse, and with the HS pulse rising to 2.35 volts, comparators 262 and 264 provide a high output. The output of comparator 264 is coupled to the active low enable of buffers 272 and 270 and to the input of buffer 274. Coupled as described, the HS sync signal rising above 1.5 volts provides a logical "high" on the output of comparator 264 and disables buffer amplifiers 270 and 272 and applies a "high" logic level to buffer 274. This "high" level is passed by buffer 274 as a horizontal sync pulse. Concurrently, the high applied to the active low enable of amplifier 270 disables amplifier 270 and allows amplifier 266 to be enabled by the ground potential via resistor 268. Amplifier 266 then passes the low from amplifier 270, signifying absence of a VS pulse.

For obtaining a VS pulse in the absence of an HS pulse, the multiplexed signal rises to 1.2 volts, above the threshold 253 for comparator 262, causing comparator 262 to output a high. This high is applied to the input of amplifier 272, which is enabled by a low to its active low enable from comparator 264, allowing amplifier 272 to pass this high as a VS pulse.

The vertical sync pulses are next applied to an LC network 276, consisting of an inductor 278 of about 39 microheneries and a capacitor 280 of about 0.22 microfarad, circuit 276 serving as a low pass filter to remove high frequency switching pulses or "glitches" caused by switching of comparators 260 and 262. This filtered VS signal is then applied to a buffer amplifier 282, which boosts the signal to a TTL level, after which the signal is applied to a noise reduction filter 284 comprising a series resistor 286 of about 100 ohms followed by a capacitor 288 of about 470 picofarads coupled in parallel to ground. This network reduces radiated noise as per FCC Part 15 requirements. Next, the signal is applied to monitor 30 through conventional cables and connectors 14.

The horizontal sync pulse from the demultiplexing circuit is applied directly to a buffer 290 for boosting the signal to TTL levels and then applied to an RC noise reduction circuit 292 similar to circuit 284. The HS signal is then applied to monitor 30 via conventional cables and connectors and cables 14.

In operation, and referring to FIG. 1, the analog red, green, and blue video signals from computer 28 are applied to signal conditioning circuit 64 (only the red circuit shown) of network 20 where the signal is applied first to base 68 of transistor 66 and across resistor 78. With switch 100 in the position shown, the driver card (not shown) in computer 28 senses about 82 ohms to ground and resultant thereto provides analog color video signals on video output terminals R,G, and B. With switch 100 in the other position, the driver card senses a high impedance and provides a monochrome signal to the G signal conditioning circuit, which is identical to circuit 64 excepting that resistor 78 is coupled directly to ground and switch 100 is absent. In either instance, the signal to base 68 is current amplified, with the potential thereof taken from emitter 70 and provided to filter network 76, which dampens ringing signals that may be generated on the conductor. The signal is then passed to network 94, which dampens reflective signals and attenuates the unused, high frequency digital computer-generated noise mixed with the signal to reduce radiated noise and in turn passes the signal to voltage divider network 83. Network 83, in concert with network 184, biases the signal to about 1.5 volts and reduces amplitude of the signal to about 200 millivolts, after which the signal is applied to the R conductor of cable 12. The described current flow between resistor 80 of network 83 and resistor 182 in network 184 provides damping of induced noise in the R video conductor of cable 12, while the voltage divider networks 83 and 184, along with circuits 76 and 94, terminate the R conductor at close to its characteristic impedance, eliminating reflective and ringing signals.

In signal conditioning network 22, where the R signal is received, voltage divider 184 also serves to maintain the biasing and damping of the signal to have a swing of about 200 millivolts about a 1.5 volt level and passes the signals to base 186 of emitter-follower transistor 188. The signal is current amplified through transistor 188 and fluctuates by about 2.4 milliamps, taken from emitter 192, and then passed to base 204 of transistor 198. As stated, the current flow through transistors 198, 200, and 202 changes by about 2.9 milliamps and is similarly phased with current flow through transistor 188. The signal is taken from the collector of transistor 200 and applied to base 218 of transistor 220. Transistor 220, due to the frequency-dependent gain as set by capacitor 230 and resistor 232, amplifies higher frequency signals and slightly attenuates low frequency signals and inverts the signal, with the inverted signal passed to base 234 of transistor 236. Transistor 236 amplifies the signal with a gain of about 6 and with a change in current flow of about 2.4 milliamps and reinverts the signal. This inversion and reinversion performed by transistors 220 and 236 do not affect current stability since they are approximately equal in magnitude but opposite in phase. Combining the inverted phase change in current flow through resistor 208 partially cancels the change in current flow through transistor 248 coupled in emitter-follower configuration, which powers the signal across the 75 ohm load in monitor 30. Bias power for each of the R, G, and B video network is filtered by an inductor 178 in series with the bias power, and a capacitor 176 shunts high frequency noise to ground.

The sync signal is amplitude multiplexed, or mixed, in network 20 by wire OR'd resistors 106 and 108 in a 2:1 ratio, with the horizontal sync having the higher amplitude signal of about 2.35 volts and the vertical sync having a lower amplitude of about 1.2 volts, with the horizontal sync pulse being offset by the amplitude of the vertical sync pulse during concurrently occurring horizontal and vertical sync pulses. The combined sync signal is then applied to a conductor of cable 12 and received by the demultiplexing circuit 249 in network 22. Here, the mixed signal is applied to the non-inverting input of comparators 260, 264, and 262, which comparators are provided with reference potentials such as to establish thresholds at 2.6 volts, 1.75 volts, and 0.875 volt, respectively. Accordingly, a sync signal rising to or above 2.6 volts, indicating horizontal pulses occurring during a vertical sync pulse, elicits an enabling output from comparators 260, 262, and 264, while a sync pulse rising to or above 1.75 volts, indicating a horizontal sync pulse only, elicits an enabling output from comparators 262 and 264; and a sync pulse rising to or above 1.2 volts, indicating a vertical sync pulse only, elicits an enabling output from comparator 264. The output of comparator 264 is provided to a buffer amplifier 274, which passes the signal as a horizontal sync pulse. The vertical sync pulse is obtained from either comparator 260 or comparator 262, with the signal from these comparators passed by one of gates 266 or 272, depending on whether or not the vertical sync pulse is occurring concurrently with the horizontal sync pulses. In the instance of a vertical pulse only, comparator 262 provides a signal to gate 272, which is enabled to pass the vertical pulse by the absence of a horizontal pulse; in the instance of a vertical pulse occurring with a horizontal pulse, gate 266 is enabled by inverting gate 270 responsive to the occurrence of a horizontal pulse to pass the vertical pulse, with the vertical pulses applied to a filter 276 to eliminate switching spikes or "glitches." The horizontal and vertical pulses so obtained are then each applied to buffers 282 and 290 and then passed across attenuation networks 284 and 292 for reducing noise radiation prior to being applied to monitor 30.

In network 20, keyboard clock signals are filtered by choke 40 and capacitor 42, eliminating video noise on the keyboard clock conductor, with a capacitor 44 filtering video noise from the keyboard data signals. The mouse clock and data signals are each provided with low value series resistors 41 and 43 to eliminate ringing and reflections from being passed to computer 28. Bias power in network 20 is filtered and stabilized by network 46 consisting of capacitors 50, 52, 54, 56, and 58, while logic ground is stabilized by circuit 48, consisting of capacitor 60 and inductor 62 coupled in parallel between the logic ground conductor and chassis ground.

In network 22, the keyboard and mouse clock and data signals are filtered by capacitive network 156, with resistors 161, 163, 165, and 167 preventing ringing signals on the clock and data lines from being passed. Network 114 stabilizes the bias power from the bias power conductor of cable 12 and passes high frequency noise to ground, while network 168 filters the logic ground potential as described.

In accordance with the foregoing, it is apparent that the applicant has provided a system for transmitting video and sync signals in conductors adjacent to other conductors conveying digital data signals and bias power and ground potentials in a cable up to 800 feet in length. Further, the quality of the signal applied to the color monitor when a color background is used is such that ghosts and indistinct edges of images thereon are virtually eliminated, resulting in high quality video at the monitor at the aforementioned distances up to about 800 feet from the computer.

What is claimed is:

1. A system for transmitting at least one discrete analog video signal from a computer video output, via a common cable to a remotely located monitor, comprising:

a first signal conditioning network comprising:
    signal current transfer means having an input coupled to said video output and responsive to said video signal for providing an output,
    an anti-ringing circuit having both reactive and resistive components coupled to said output of said transfer means,
    a reactive anti-reflective circuit coupled to said output of said transfer means,
    a first voltage divider coupled at an intermediate point to said anti-ringing circuit and disposed for referencing the video signal from said last-named output about a first selected voltage level, and wherein the signal is attenuated to a selected amplitude, and
    a cable having a plurality of insulated conductors up to about 800 feet in length, with a first of said conductors coupled at one end to said point of said first voltage divider; and
  a second signal conditioning network comprising:
    a second voltage divider having an intermediate point coupled to an opposite end of said first conductor, for receiving said video signal and referencing said video signal at a selected voltage level and said signal at a selected amplitude, and
    amplifier means responsive to said video signal from said second voltage divider, for amplifying said video signal with a characteristic which varies directly in amplitude with frequency and providing an amplified said video signal as an output.

2. A system for transmitting a plurality of channels of color video signals from computer outputs via a common cable to a remotely located monitor wherein each channel comprises:

a first signal conditioning network comprising:
    signal current transfer means having an input coupled to said video output and responsive to said video signal for providing an output,
    an anti-ringing circuit having both reactive and resistive components coupled to said output of said transfer means,
    a reactive anti-reflective circuit coupled to said output of said current transfer means;
    a first voltage divider coupled at an intermediate point to said anti-ringing circuit and disposed for referencing the video signal from said last-named output about a first selected voltage level, and wherein the signal is attenuated to a first selected amplitude, and
    a cable having a plurality of insulated conductors up to about 800 feet in length, with a first of said conductors coupled at one end to said point of said first voltage divider; and
  a second signal conditioning network comprising:
    a second voltage divider having an intermediate point coupled to an opposite end of said first conductor, for receiving said video signal and referencing said video signal at a selected voltage level and said signal at a selected amplitude, and
    amplifier means responsive to said video signal from said second voltage divider, for amplifying said video signal with a characteristic which varies directly in amplitude with frequency and providing an amplified said video signal as an output.

3. A system as set forth in claim 2 wherein said amplifier means is a generally constant current amplifier, for amplifying said video signal.

4. A system as set forth in claim 2 wherein said first voltage divider references said video signal to a potential of about fifty percent of a bias power voltage potential, and said selected amplitude is up to sixty percent of said video signal from said computer.

5. A system as set forth in claim 2 wherein said signal current transfer means comprises a transistor coupled in emitter-follower configuration to said conductor, with power for said transistor provided by said first voltage divider circuit.

6. A system as set forth in claim 5 wherein said reactive anti-ringing circuit comprises a first resistor coupled in series between said first voltage divider and said transistor, with a first capacitor coupled across said resistor, and a second capacitor in series with a second resistor, said second capacitor and said second resistor coupled across said first resistor, said first resistor, said first capacitor, said second capacitor, and said second resistor disposed to dampen ringing signals occurring on said conductor.

7. A system as set forth in claim 2 wherein said anti-reflective circuit comprises a third resistor in series with a third capacitor and disposed to dampen reflected signals occurring on said conductor.

8. A system as set forth in claim 2 comprising vertical and horizontal sync multiplexing means in said first signal conditioning network and coupled to a second conductor of said cable and disposed to provide combined horizontal and vertical sync pulses to said second conductor in multiplexed relation and demultiplexing circuitry in said second signal conditioning network coupled to said second conductor and said monitor, for demultiplexing said combined vertical and horizontal sync pulses and providing discrete said horizontal and vertical sync pulses to said monitor.

9. A system as set forth in claim 2 wherein bias power and a reference ground potential for said second signal conditioning network is provided by a plurality of conductors, respectively, of said cable, for distributing a voltage drop of said bias power and reference ground potentials, said plurality of conductors coupled to power and ground terminals of said computer, and wherein current flow in said plurality of conductors is limited to a variance of about 12 milliamps.

10. A system as set forth in claim 9 wherein said bias power for said first signal conditioning network is filtered by a plurality of capacitors having values from about 0.1 microfarad to about 22 microfarads, said capacitors coupled in parallel between a source of said bias power and a ground potential, and said ground potential is filtered by a low pass filter.

11. A system as set forth in claim 2 wherein keyboard clock and data signals are applied to third and fourth conductors of said cable and conditioned in said first signal conditioning network by a relatively small capacitor coupled between the third conductor and a stable potential and a relatively small capacitor coupled between said fourth conductor and said stable potential, for shunting low frequency noise on said third and fourth conductors to said stable potential.

12. A system as set forth in claim 11 wherein mouse clock and data signals are applied to fifth and sixth conductors, respectively, of said cable, said fifth and sixth conductors coupled to mouse clock and data terminals of said computer and conditioned in said first signal conditioning network by a relatively small value resistor in said fifth conductor and a relatively small value resistor in said sixth conductor, for preventing ringing and reflective noise signals from being passed to said computer.

13. A system as set forth in claim 12 comprising a relatively large capacitor coupled between each of said third, fourth, fifth, and sixth conductors in said second signal conditioning network, for shunting low frequency noise to said stable potential.

14. A system as set forth in claim 13 including a power conditioning circuit in said second signal conditioning network comprising a plurality of capacitors coupled between said bias power and said ground potential, said capacitors disposed for passing high and low frequency noise from said bias power to said ground potential.

15. A system as set forth in claim 14 including a discrete filtering network coupled between said bias power and said video amplifier comprising a capacitor of about 0.33 microfarad coupled between said bias power and said ground potential and an inductor of about 39 microhenries coupled in series between said bias power and said video amplifier, for shunting noise in excess of said video signal to ground and blocking noise in excess of said video signal from said video amplifier.

16. A system as set forth in claim 9 wherein said multiplexing circuitry in said first signal conditioning network comprises:
a first selected resistance in series with said vertical sync signal, producing a first sync signal having one discrete amplitude;
a second selected resistance in series with said horizontal sync signal, producing a sync signal having a second discrete amplitude, said first and second resistances coupled in a wire-OR'd relation, wherein said vertical and horizontal sync signals are combined, producing a combined horizontal and vertical sync signal having a plurality of amplitudes, said combined signal applied to a single conductor of said cable; and said demultiplexinq circuitry further comprising;
first comparator logic means having an input coupled to said combined signal and disposed for sensing an amplitude of said vertical and horizontal sync pulses occurring concurrently and providing on an output a first enabling signal responsive thereto,
second comparator logic means having an input coupled to said combined signal and disposed for sensing an amplitude of said horizontal sync pulses and said concurrently occurring horizontal and vertical sync pulses and providing on an output a second enabling signal responsive thereto,
third comparator logic means having an input coupled to said combined signal and disposed for providing an enabling signal responsive to an amplitude of said concurrently occurring horizontal and vertical sync pulses, said horizontal sync pulses, and said vertical sync pulses, and providing as an output a third enabling signal responsive thereto,
first gating logic means having an input coupled to said output of said first comparator logic means and having an enabling input coupled via inversion means for inverting a signal to said output of said second comparator means, said first gating logic means disposed for providing a vertical sync pulse when enabled by an inverted signal produced by said second comparator and when said first comparator provides a signal responsive to said concurrent signals,
second gating logic means having an input coupled to said output of said third comparator and having an enabling input coupled to said second comparator, for providing a vertical sync pulse when enabled by said output of said second comparator and when said third comparator provides a signal responsive to said amplitude of a vertical sync pulse, and
a buffer amplifier coupled to said output of said second comparator logic means, for passing said enabling signal from said second comparator as a horizontal sync pulse.

17. A system for transmitting via a common cable a plurality of signals including analog video signals, horizontal and vertical sync pulses, and clock and data signals of a keyboard, between terminals of a computer disposed to receive and provide said signals, and a monitor and keyboard, comprising:
a first signal conditioning network further comprising:
a signal current transfer means having an input coupled to said analog video signal and responsive to said video signal, for providing an output,
an anti-ringing circuit having both resistive and reactive components and coupled to said output of said transfer means,
a reactive anti-reflective circuit coupled to said output of said transfer means,
a first voltage divider coupled at a midpoint to said anti-ringing circuit, for referencing said video signal from said output about a selected voltage potential and wherein the signal is attenuated to a selected amplitude, and a cable having a plurality of insulated, adjacent conductors up to about 800 feet in length, with a first said conductor coupled to a mid-point of said first voltage divider, and a second signal conditioning network including first and second power terminals comprising:

a second voltage divider coupled at a mid-point to an opposite end of said first conductor, for referencing said analog video signal about said selected voltage level and wherein said signal is attenuated to said selected amplitude, a generally constant current amplification means responsive to said video signal from said second voltage divider, for amplifying said video signal and providing an amplified analog video signal as an output, horizontal and vertical sync signal transmission and reception means in said first and second signal conditioning networks, for applying said horizontal and vertical sync signals to at least a second conductor of said cable and applying said horizontal and vertical sync signals to said monitor, and third and fourth conductors of said cable coupled to terminals of said computer for transmitting said keyboard clock and data signals between said keyboard and said computer, and wherein said keyboard clock and data signals are conditioned in said first signal conditioning network by first and second high pass filter means coupled between said third and fourth conductors, respectively, for passing high frequencies in excess of said keyboard clock and data signals to said stable potential, and a low pass filter in series with said third conductor, for blocking high frequencies in excess of said clock signal from said computer, and wherein said keyboard clock and data signals are conditioned in said second signal conditioning network by third and fourth high pass filter means coupled to said third and fourth conductors, respectively, for passing high frequencies in excess of said keyboard clock and data signals to said stable potential.

18. A system for transmitting via a common cable a plurality of signals including analog video signals, horizontal and vertical sync pulses, and clock and data signals of a keyboard and mouse, between terminals of a computer disposed to receive and provide said signals, and a monitor, keyboard, and mouse, comprising:

a first signal conditioning network further comprising:

a signal current transfer means having an input coupled to said analog video signal, for providing an output, an anti-ringing circuit having both resistive and reactive components and coupled to said output of said transfer means, a reactive anti-reflective circuit coupled to said output of said transfer means, a first voltage divider coupled at a mid-point to said anti-ringing circuit, for referencing said analog video signal from said output about a selected voltage potential, and wherein the signal is attenuated to a selected amplitude, and a cable having a plurality of insulated, adjacent conductors up to about 800 feet in length, with a first said conductor coupled to a mid-point of said first voltage divider; and a second signal conditioning network including first and second power terminals comprising:

a second voltage divider coupled at a mid-point to said first conductor, for referencing said analog video signal, and wherein said video signal is attenuated to a selected amplitude, a generally constant current amplification means responsive to said video signal from said second voltage divider, for amplifying said analog video signal and providing an amplified video signal as an output, horizontal and vertical sync signal transmission and reception means in said first and second signal conditioning networks, for applying said horizontal and vertical sync signals to at least a second conductor of said cable and applying said horizontal and vertical sync signals to said monitor, third and fourth conductors of said cable coupled to terminals of said computer for transmitting said keyboard clock and data signals between said keyboard and said computer, and wherein said keyboard clock and data signals are conditioned in said first signal conditioning network by first and second high pass filter means coupled between said third and fourth conductors, respectively, and a stable potential, for passing high frequencies in excess of said clock and data signals to said stable potential, and wherein said keyboard clock and data signals are conditioned in said second signal conditioning network by third and fourth high pass filter means coupled between said third and fourth conductors, respectively, and said stable potential, for passing high frequencies in excess of said keyboard clock and data signals to said stable potential, and fifth and sixth conductors of said cable coupled to terminals of said computer for transmitting mouse clock and data signals between said mouse and said computer, and wherein said mouse clock and data signals are conditioned in said first signal conditioning network by first and second relatively low resistances coupled in series with said fifth and sixth conductors, respectively, of said cable, for preventing ringing noise signals from being passed to said computer, and wherein said mouse clock and data signals are conditioned in said second signal conditioning network by fifth and sixth high pass filter means coupled between said fifth and sixth conductors of said cable, respectively, for passing low frequencies to said stable potential, and third and fourth relatively low resistances coupled in series with said fifth and sixth conductors, for preventing ringing noise signals from being passed to said cable.

* * * * *